United States Patent
Nolan et al.

(10) Patent No.: US 12,108,487 B2
(45) Date of Patent: Oct. 1, 2024

(54) MATCHING PIPELINE FOR A COMMUNICATION SYSTEM

(71) Applicant: Intercom, Inc., San Francisco, CA (US)

(72) Inventors: Eoin Nolan, Dublin (IE); Séan Smithers, Dublin (IE); Paul Magrath, Dublin (IE)

(73) Assignee: Intercom, Inc., San Francisco, CA (US)

( * ) Notice: Subject to any disclaimer, the term of this patent is extended or adjusted under 35 U.S.C. 154(b) by 0 days.

(21) Appl. No.: 17/884,153

(22) Filed: Aug. 9, 2022

(65) Prior Publication Data

US 2023/0079593 A1   Mar. 16, 2023

Related U.S. Application Data

(60) Provisional application No. 63/244,141, filed on Sep. 14, 2021.

(51) Int. Cl.
*H04W 8/18* (2009.01)
*H04W 4/08* (2009.01)

(52) U.S. Cl.
CPC ............ *H04W 8/186* (2013.01); *H04W 4/08* (2013.01)

(58) Field of Classification Search
CPC ..... H04W 8/186; H04W 4/08; G06F 15/7878; G06F 9/30079; G06F 9/3869; G06F 9/06; G06F 17/30309; G06F 17/30; G06F 11/1469; G06F 11/1471; G06F 11/36; G06F 11/1435; G06F 16/219; G06F 16/90; G06F 16/23; G06F 16/00; G06F 16/128; G06F 16/1774; G06F 16/1865; G06F 16/2228; G06F 16/2246; G06F 16/27; G06F 16/282; G06F 16/24568; G06F 16/2428; G06F 16/9024; G06F 16/284; G06F 16/17

See application file for complete search history.

(56) References Cited

U.S. PATENT DOCUMENTS

| | | | |
|---|---|---|---|
| 9,766,990 B1 * | 9/2017 | Michaud | G06F 12/0246 |
| 9,892,325 B2 * | 2/2018 | Kanga | G06V 20/53 |
| 10,152,381 B1 * | 12/2018 | Shvaiger | G06F 3/0631 |
| 10,198,774 B1 * | 2/2019 | Wang | G06Q 40/123 |

(Continued)

FOREIGN PATENT DOCUMENTS

CN    114282506 A  *  4/2022

*Primary Examiner* — Un C Cho
*Assistant Examiner* — Rasha K Fayed
(74) *Attorney, Agent, or Firm* — Womble Bond Dickinson (US) LLP

(57) ABSTRACT

Methods and systems for optimizing timing of sending communications to a user device are disclosed. The method includes identifying a first group of user objects having a first attribute. The method includes locating active checkpoints within a user path with each active checkpoint having a user object associated therewith. The method includes forming a second group of the user objects associated with the active checkpoints. The method includes removing, with a processing device, user objects from the first group and the second group that match a second attribute to form a third group with the remaining user objects form the first group and the second group. The method includes processing the active checkpoint for each user object of the third group in response to forming the third group.

19 Claims, 11 Drawing Sheets

(56) References Cited

U.S. PATENT DOCUMENTS

| | | | | |
|---|---|---|---|---|
| 2009/0171705 | A1* | 7/2009 | Bobak | G06Q 50/188 |
| | | | | 705/80 |
| 2015/0058333 | A1* | 2/2015 | Doron | G06Q 50/184 |
| | | | | 707/723 |
| 2016/0065658 | A1* | 3/2016 | Alon | G06Q 10/063116 |
| | | | | 709/204 |
| 2016/0253731 | A1* | 9/2016 | Ketchel, III | G06Q 30/0206 |
| | | | | 705/26.5 |
| 2017/0109214 | A1* | 4/2017 | Raman | G06F 9/4881 |
| 2017/0109377 | A1* | 4/2017 | Baer | G06F 16/9535 |
| 2017/0228292 | A1* | 8/2017 | Akbulut | G06F 11/1451 |
| 2017/0235775 | A1* | 8/2017 | McKenna | G06F 16/285 |
| | | | | 707/741 |
| 2017/0300864 | A1* | 10/2017 | Vigeant | G06Q 10/1053 |
| 2018/0011626 | A1* | 1/2018 | Kelley | G06Q 10/0639 |
| 2018/0089245 | A1* | 3/2018 | Warren, Jr. | G06F 16/235 |
| 2018/0307915 | A1* | 10/2018 | Olson | G05D 1/0231 |
| 2019/0057101 | A1* | 2/2019 | Esserlieu | G06F 3/0604 |
| 2019/0102375 | A1* | 4/2019 | Goulikar | G06F 40/186 |
| 2019/0232155 | A1* | 8/2019 | Darabian | A63F 13/80 |
| 2020/0202997 | A1* | 6/2020 | Hadad | G16H 50/70 |
| 2020/0273575 | A1* | 8/2020 | Wolf | G16H 30/40 |
| 2020/0276502 | A1* | 9/2020 | Gustafsson | A63F 13/53 |
| 2021/0382863 | A1* | 12/2021 | Munipalle | G06F 16/215 |
| 2022/0284400 | A1* | 9/2022 | Hutton | G06F 16/9535 |

* cited by examiner

MATCHING PIPELINE FOR A COMMUNICATION SYSTEM

CROSS-REFERENCE TO RELATED APPLICATION

This application claims priority to, and benefit of, U.S. Provisional Patent Application No. 63/244,141, filed Sep. 14, 2021, the entire contents of which are hereby incorporated by reference.

TECHNICAL FIELD

The present disclosure relates to systems and methods for managing communications and, more specifically, systems and methods for managing communications with users and potential users of a system.

BACKGROUND

Customer relationship management (CRM) software is software that automates and manages interactions with an organization. A conversational messaging system may allow an organization to define conversational experiences for commerce, marketing, and support using in-product channels (e.g., chatbots, live messaging, banners) and out of product channels (e.g., email, short message service (SMS) messages). CRM software or conversational messaging systems may be used by an organization to maintain contact with customers and quickly respond to their needs. CRM software or conversational messaging systems may be used by an organization to increase engagement with the organization.

SUMMARY

One aspect disclosed herein is directed to a method that includes identifying a first group of user objects that each have a first attribute. The method includes loading active checkpoints within a user path with each active checkpoint having a user object associated therewith. The method includes forming a second group of user objects associated with the active checkpoints. The method includes removing, with a processing device, user objects from the first group and the second group that match a second attribute to form a third group with the remaining user objects from the first group and the second group. The method includes processing the active checkpoint for each user object of the third group in response to forming the third group.

In another aspect, the present disclosure is directed to a system that includes a memory and a processing device that is operatively coupled to the memory. In some embodiments, the processing device identifies a first group of user objects that each have a first attribute. In some embodiments, the processing devices locates active checkpoints within a user path with each active checkpoint having a user object associated therewith and forming a second group of the user objects associated with the active checkpoints. In some embodiments, the processing device removes user objects from the first group and the second group that match a second attribute to form a third group with the remaining user objects from the first group and the second group. In some embodiments, the processing device processes the active checkpoint for each user object of the third group in response to forming the third group.

In another aspect, the present disclosure is directed to a non-transitory computer-readable medium storing instructions that, when executed by a processing device, cause the processing device to identify a first group of user objects having a first attribute. In some embodiments, the instructions may cause the processing device to locate active checkpoints within a user path with each active checkpoint having a user object associated therewith and to form a second group of the user objects associated with the active checkpoints. In some embodiments, the instructions may cause the processing device to remove user objects from the first group and the second group that match a second attribute to form a third group with the remaining user objects from the first group and the second group. In some embodiments, the instructions may cause the processing device to process the active checkpoints for each user object of the third group in response to forming the third group.

It will therefore be appreciated that this Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects, and advantages will become apparent from the following detailed description taken in conjunction with the accompanying figures which illustrate, by way of example, the principles of some described example implementations.

Further, to the extent consistent, any of the embodiments or aspects described herein may be used in conjunction with any or all of the other embodiments or aspects described herein.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

Figure 1A:
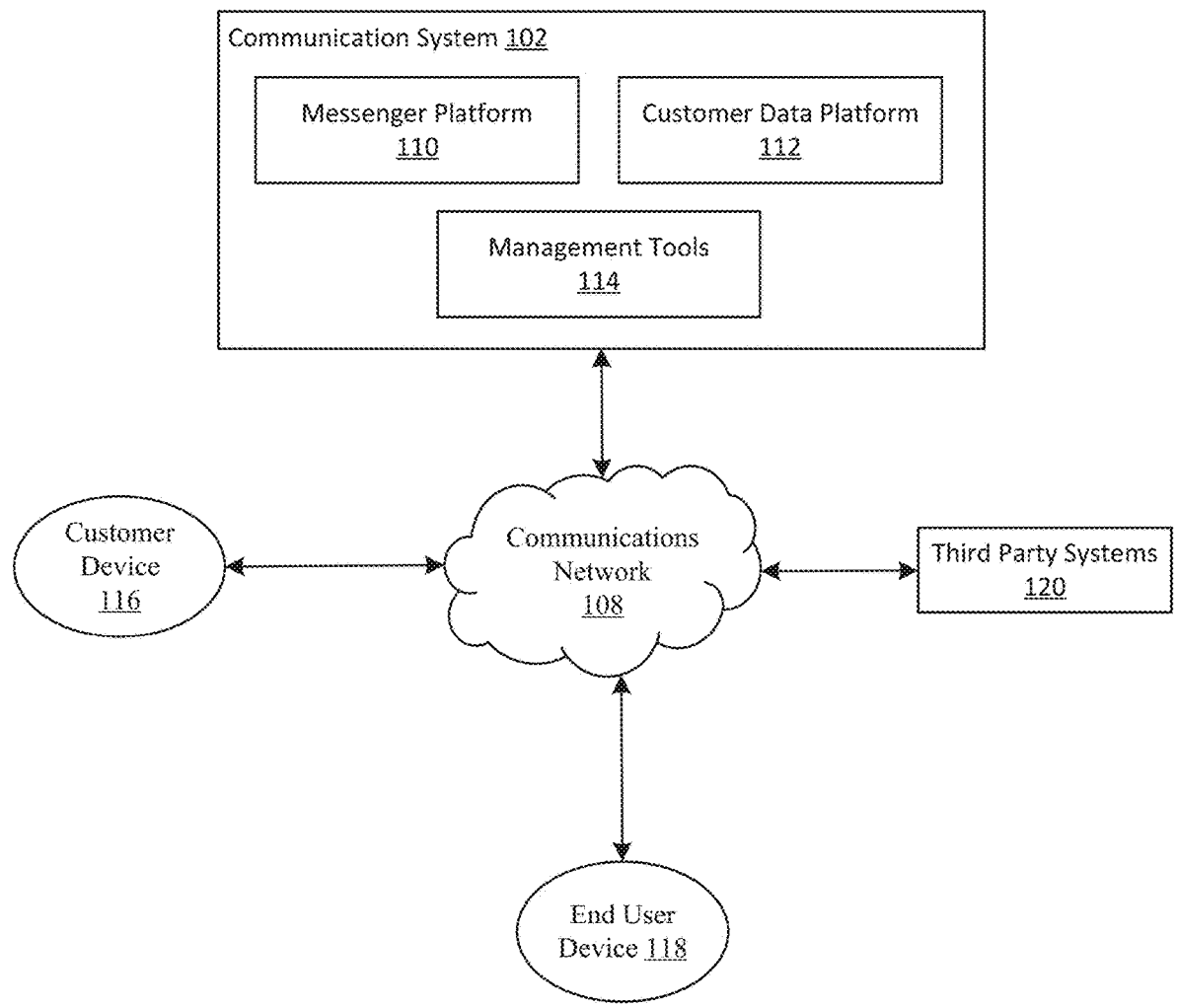
FIG. 1A is a block diagram depicting an example environment for managing communications with users and potential users of a communication system, according to some embodiments.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements.

As used herein, the term "communication system" may refer to the system and/or program that manages communications between individuals and companies. The term "customer" may refer to a company or organization utilizing the communication system to manage relationships with its end users or potential end users (leads). The term "user" may refer to an end user or lead that is interfacing with the customer through the communication system. The term "company" may refer to an organization or business that includes a group of users. The term "engineer" may refer to staff managing or programing the communication system. The term "product" may refer to a website, application, or program of the customer.

As described in the below passages, the communication system may place (e.g., assign, allocate) user objects associated with a user device of a user into user paths developed by a customer, monitor interaction of users with customer products, and communicate with the users via the user device based on interactions with the customer products to advance user objects through the user paths. The communication system may monitor and/or detect interactions of the user with the customer's product and advance the user objects along the user paths based on conditions set by the customer during development of the user paths. The interactions of the users may include, but not be limited to, accessing a product, moving through pages within the product, utilizing features of the product or making a purchase within the product. The communication system, the customer, and/or third party software may communicate with the users via the user devices as the user objects are advanced through the user paths. Communications with the users may include, but not be limited to, banners, pop-ups, chat windows, in product direct messaging, emails, push messages, instant messages, or short message service (SMS) messages. The communication system may include reporting functions that allow a customer to monitor the status of user objects along the developed user paths.

FIG. 1A is a block diagram depicting an example environment for managing communications with users and potential users of a communication system, according to some embodiments. As shown, the environment 100 includes a communication system 102 that is interconnected with a customer device 116, an end user device 118, and third party systems 120 via a communications network 108. The communications network 108 may be the internet, a wide area network (WAN), intranet, or other suitable network. The communication system 102 may be hosted on one or more local servers, may be a cloud based system, or may be a hybrid system with local servers and in the cloud. The communication system 102 is maintained by engineers which develop management tools 114 that include an interface or editor for clients of the communication system 102 to interface with the communication system 102.

The communication system 102 includes management tools 114 that are developed to allow customers to develop user series or user paths in the form of nodes and edges (e.g., connections) that are stored in a customer data platform 112 of the communication system 102. The communication system 102 includes a messenger platform 110 that interacts with end user devices 118 in accordance with the user paths stored in the customer data platform 112.

A customer interacts with the communication system 102 by accessing a customer device 116. The customer device 116 may be a general purpose computer or a mobile device. The customer device 116 allows a customer to access the management tools 114 to develop the user paths stored in the customer data platform 112. For example, the customer device 116 may execute an application using its hardware (e.g., a processor, a memory) to send a request to the communication system 102 for access to a graphical editor, which is an application programming interface (API) stored in the management tools 114. In response to receiving the request, the communication system 102 may send a software package (e.g., executable code, interpreted code, programming instructions, libraries, hooks, data, etc.) to the customer device 116 to cause the customer device 116 to execute the software package using its hardware (e.g., processor, memory). In some embodiments, the application may be a desktop or mobile application, or a web application (e.g., browser). The customer device 116 may utilize the graphical editor to build the user paths within the graphical editor. The graphical editor may periodically send copies (e.g., snapshots) of the user path as it is being built to the communication system 102, which in turn, may store the user paths to the customer data platform 112. The user paths manage communication of the customer with a user to advance a user object associated with the user through the user paths. The user paths may be developed to increase engagement of a user with the customer via the messenger platform 110.

The messenger platform 110 may interact with a user through an end user device 118 that accesses the communication network 108. The end user device 118 may be a general purpose computer or mobile device that accesses the communication network 108 via the internet or a mobile network. The user may interact with the customer via a website of the customer, a messaging service, or interactive chat. In some embodiments, the user paths may allow a customer to interface with users through mobile networks via messaging or direct phone calls. In some embodiments, a customer may develop a user path in which the communication system 102 interfaces with a user device via a non-conversational channel such as email.

The communication system 102 includes programs or workers that place user objects into the user paths developed by the customers stored in the customer data platform 112. The communication system 102 may monitor progress of the user objects through the user paths developed by the customer and interact with the customer based on the nodes and edges developed by the customer for each user path. In some embodiments, the communication system 102 may remove user objects from user paths based on conditions developed by the customer or by the communication system 102.

The communication system 102 and/or the customers may employ third party systems 120 to receive (e.g., retrieve, obtain, acquire), update, or manipulate (e.g., modify, adjust) the customer data platform 112 or user data which is stored in the customer data platform 112. For example, a customer may utilize a third party system 120 to have a client chat directly with a user via the end user device 118 or may utilize a bot (e.g., a software program that performs automated, repetitive, and/or pre-defined tasks) to interact with a user via the end user device 118 via chat or messaging.

Although FIG. 1A shows only a select number of computing devices and/or systems (e.g., communication system 102, customer device 116, third party systems 120, and end user device 118), the environment 100 may include any number of computing devices and/or systems that are interconnected in any arrangement to facilitate the exchange of data between the computing devices and/or systems.

Figure 1B:
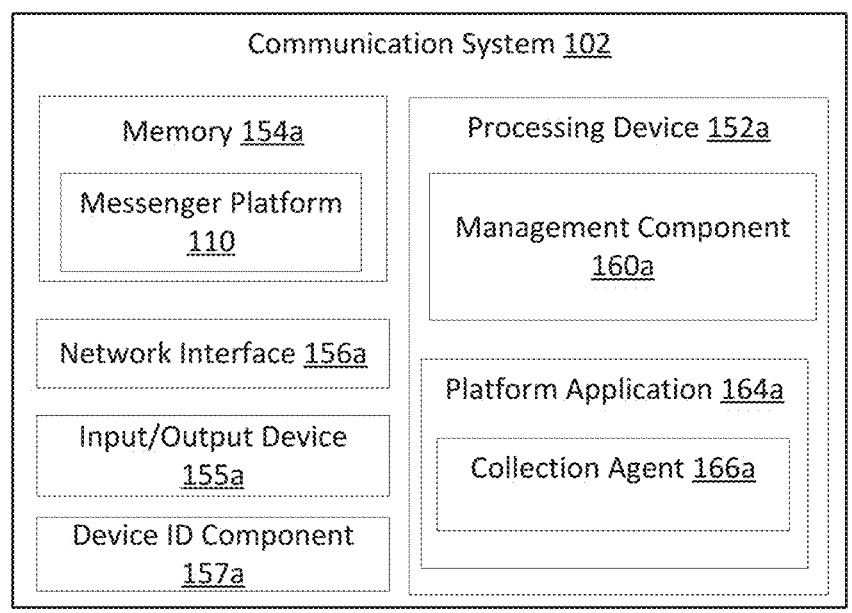
FIG. 1B is a block diagram depicting an example of the communication system of FIG. 1A, according to some embodiments.

FIG. 1B is a block diagram depicting an example of a communication system 102 of FIG. 1A, according to some embodiments. While various devices, interfaces, and logic with particular functionality are shown, it should be understood that the communication system 102 includes any number of devices and/or components, interfaces, and logic for facilitating the functions described herein. For example, the activities of multiple devices may be combined as a single device and implemented on a same processing device (e.g., processing device 152a), as additional devices and/or components with additional functionality are included.

The communication system 102 includes a processing device 152a, a memory 154a, an input/output device 155a, a network interface 156a, and a device ID component 157a. The memory 154a may include the messenger platform 110 stored therein. The processing device 152a may include a management component 160a or a platform application 164a. The platform application 164a may include a collection agent 166a.

The processing device 152a of the messenger platform 110 may perform checks for the completion of a task. The task may be completed by the platform application 156 or the end user device 118. The processing device 152a may send messages to the end user device 118 responsive to the checks, e.g., the checks being true or false. The messages sent by the processing device 152a may be sent via an in-product channel or an out-of-product channel. In certain embodiments, the messages may be sent as an email. The processing device 152a may advance a user object through a user path executed by the processing device 152a.

The processing device 152a includes (e.g., general purpose processor, a PLD, etc.), which may be composed of one or more processors, and a memory 154a (e.g., synchronous dynamic random access memory (DRAM), read-only memory (ROM)), which may communicate with each other via a bus (not shown).

The processing device 152a may be provided by one or more general-purpose processing devices such as a microprocessor, central processing unit, or the like. In some embodiments, processing device 152a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 152a may comprise one or more special-purpose processing devices such as an application specific integrated circuit (ASIC), a field programmable gate array (FPGA), a digital signal processor (DSP), network processor, or the like. The processing device 152a may be configured to execute the operations described herein, in accordance with one or more aspects of the present disclosure, for performing the operations and steps discussed herein.

The processing device 152a may include and/or execute an application (shown in FIG. 1B as, "platform application 164a") that is displayed on a computer screen of the communication system 102. In some embodiments, the platform application 164a may be an application that is or has undergone one or more stages of a software development process for the purpose of developing the application into a final product for private use, public use, and/or commercial use. In some embodiments, the platform application 164a may be configured to need one or more computing resources (e.g., networking resources, data storage resources, processing resources, one or more files) in order to completely execute (e.g., execute without error and/or interruption). In some embodiments, the platform application 164a may be configured to send a communication, via the communications network 108 (shown in FIG. 1A) to the customer device 116 or the end user device 118.

The platform application 164a may include a collection agent 166a. The collection agent 166a may include an application plug-in, application extension, subroutine, browser toolbar, daemon, or other executable logic for collecting data processed by the platform application 164a and/or monitoring interactions of the end user device 118. In other embodiments, the collection agent 166a may be a separate application, service, daemon, routine, or other executable logic separate from the platform application 164a but configured for intercepting and/or collecting data processed by platform application 164a, such as a screen scraper, packet interceptor, application programming interface (API) hooking process, or other such application. The collection agent 166a may capture interactions with a product, e.g., a website, an application, or a program, by the end user device 118. In some embodiments, the collection agent 166a generates collection data based on communications received from end user device 118 via the network interface 156a by way of the communications network 108.

The processing device 152a may execute a management component 160a. In some embodiments, the management component 160a may be configured to launch and/or execute a user path. In some embodiments, the management component 160a may be configured to launch (e.g., start, trigger, activate) the platform application 164a to cause platform application 164a to execute on the processing device 152a. The management component 160a may identify and move user objects representative of a user interfacing with the messenger platform 110 via an end user device 118 through the user paths. At times, the user paths and/or the user objects may store in the memory 154a.

The memory 154a (e.g., Random Access Memory (RAM), Read-Only Memory (ROM), Non-volatile RAM (NVRAM), Flash Memory, hard disk storage, optical media, etc.) stores data and/or computer instructions/code for facilitating at least some of the various processes described herein. The memory 154*a* includes tangible, non-transient volatile memory, or non-volatile memory. The memory 154*a* stores programming logic (e.g., instructions/code) that, when executed by the processing device 152*a*, controls the operations of the messenger platform 110. In some embodiments, the processing device 152*a* and the memory 154*a* form various processing devices and/or circuits described with respect to the messenger platform 110. The instructions include code from any suitable computer programming language such as, but not limited to, C, C++, C#, Java, JavaScript, VBScript, Perl, HTML, XML, Python, TCL, and Basic.

The communication system 102 includes a network interface 156*a* configured to establish a communication session with a computing device for sending and receiving data over the communication network 108 to the computing device. Accordingly, the network interface 156*a* includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the communication system 102 includes a plurality of network interfaces 156*a* of different types, allowing for connections to a variety of networks, such as local area networks (public or private) or wide area networks including the Internet, via different sub-networks.

The communication system 102 may include an input/output device 155*a* configured to receive input from and provide information to engineers. In this regard, the input/output device 155*a* is structured to exchange data, communications, instructions, etc. with an input/output component of the communication system 102. Accordingly, input/output device 155*a* may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the communication system 102, such as a built-in display, touch screen, microphone, etc., or external to the housing of the communication system 102, such as a monitor connected to the communication system 102, a speaker connected to the communication system 102, etc., according to various embodiments. In some embodiments, the communication system 102 includes communication circuitry for facilitating the exchange of data, values, messages, and the like between the input/output device 155*a* and the components of the communication system 102. In some embodiments, the input/output device 155*a* includes machine-readable media for facilitating the exchange of information between the input/output device 155*a* and the components of the communication system 102. In still another embodiment, the input/output device 155*a* includes any combination of hardware components (e.g., a touchscreen), communication circuitry, and machine-readable media.

The communication system 102 includes a device identification component 157*a* (shown in FIG. 1B as device ID component 157*a*) configured to generate and/or manage a device identifier associated with the communication system 102. The device identifier may include any type and form of identification used to distinguish the communication system 102 from other computing devices. In some embodiments, to preserve privacy, the device identifier may be cryptographically generated, encrypted, or otherwise obfuscated by any device and/or component of communication system 102. In some embodiments, the communication system 102 may include the device identifier in any communication (e.g., establish connection request, resource request) that the communication system 102 sends to a computing device.

The communication system 102 includes a bus (not shown), such as an address/data bus or other communication mechanism for communicating information, which interconnects the devices and/or components of communication system 102, such as processing device 152*a*, memory 154*a*, network interface 156*a*, input/output device 155*a*, device ID component 157*a*, and management component 160*a*.

In some embodiments, some or all of the devices and/or components of the messenger platform 110 may be implemented with the processing device 152*a*. For example, the messenger platform 110 may be implemented as a software application stored within the memory 154*a* and executed by the processing device 152*a*. Accordingly, such embodiments can be implemented with minimal or no additional hardware costs. In some embodiments, any of these above-recited devices and/or components rely on dedicated hardware specifically configured for performing operations of the devices and/or components.

Figure 2:
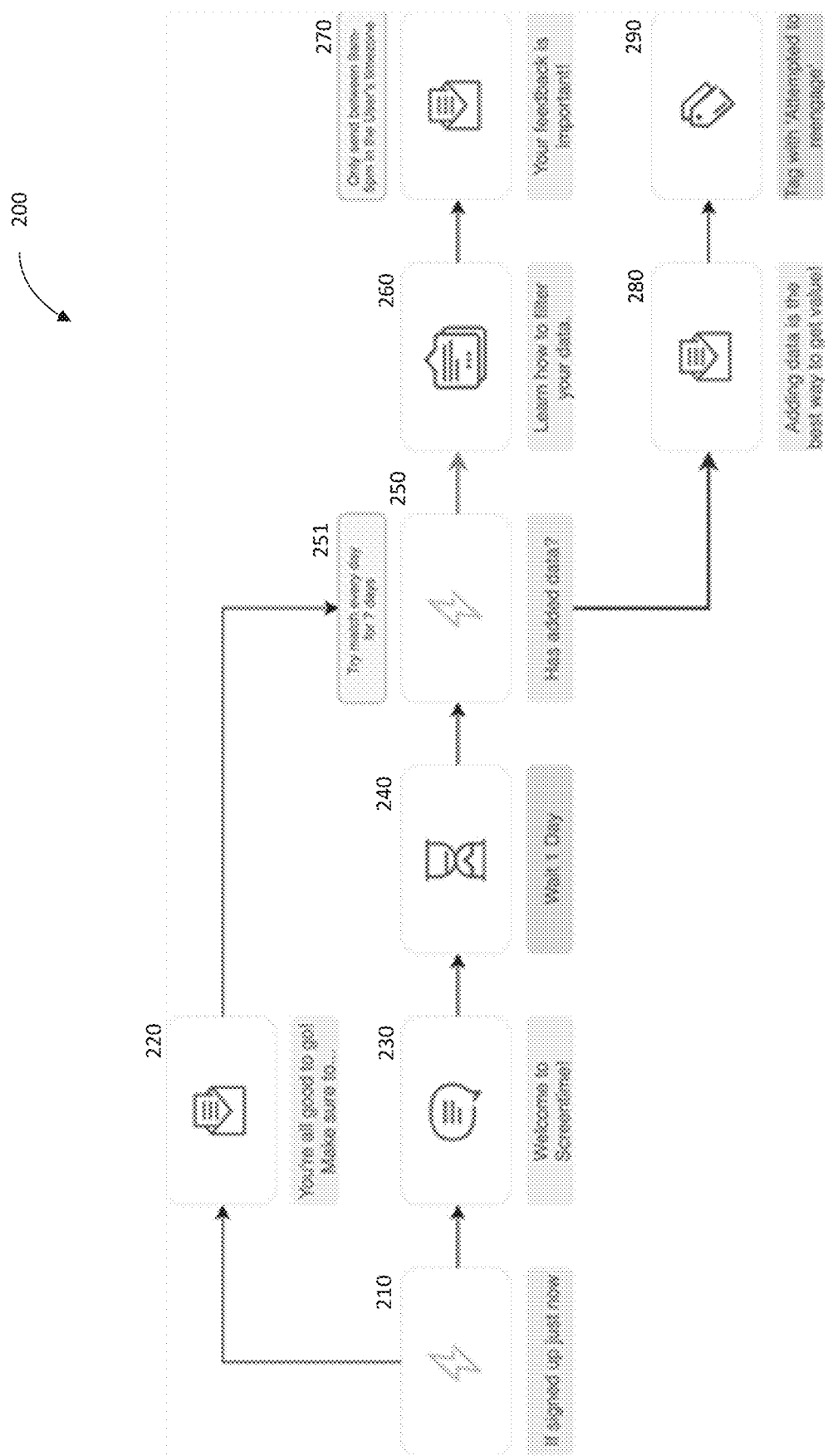
FIG. 2 is a block diagram of an example user path, according to some embodiments.

FIG. 2 is a block diagram of an example user path 200, according to some embodiments. The user path 200 may be developed by a customer using the customer data platform 112 and/or the management tools 114 of the communication system 102. The user path 200 may be created using a graphical editor tool to allow the customer to develop the user path 200. When the user path 200 is developed, the customer may activate or launch the user path 200. When the user path 200 is activated or launched, the user path 200 is loaded into and executed in the messenger platform 110 as discussed in greater detail below.

The user path 200 includes a starting or entry condition 210 that includes a rule for entry into the user path 200. When the entry condition 210 is met or matched to a user object, the user object is placed into the user path 200 and is advanced to subsequent steps within the user path 200. The user path 200 includes two subsequent steps from the entry condition 210, message 220 and application 230.

When the entry condition 210 is matched to the user object, the user object is advanced to the message 220 and at the same time is advanced to chat 230. The message 220 may have a rule or condition to match before the message 220 is sent. When the condition for the message 220 is matched, the message 220 is sent to an end user device 118 associated with the user object and the user object is advanced to the rule 250. The chat 230 may have a condition before the chat 230 is initiated. When the condition of the chat is matched, the chat 230 is initiated with the end user device 118 associated with the user object and the user object is advanced to the delay or wait period 240. When the wait period 240 is elapsed, the user object is advanced to rule 250.

The rule 250 may have a true path that extends to lesson or tour 260 and a false path that leads to lesson or tour 280. When the rule 250 is met or matched, the user object is advanced to the tour 260 and when the rule 250 fails or is not matched, the user object is advanced to the tour 280. In embodiments, the rule 251 may have a sub-rule 251. The sub-rule 251 may be a repeated check or an amount of time that the rule 251 may be checked. In the example, when the rule 250 fails, the user object is held at the rule 250 by the sub-rule 251 for seven days with the rule 250 being rechecked each day of the seven days before the rule 250 is considered to be failed and the user object advanced down the false path to tour 280.

When the user object is advanced to the tour 260, the tour 260, may have a condition to match to the user object before sending or initiating the tour 260. When the condition is matched, the tour 260 is initiated on the end user device 118 associated with the user object and the user object is advanced to message 270. The message 270 may have a condition to match before sending the message 270. When the condition is matched, the message 270 is sent to the end user device 118. In embodiments, the condition for sending the message 270 may be a time of day. When the message 270 is sent to the end user device 118, the user path 200 is completed by the user object.

When the user object is advanced to the tour 280, the tour 280, may have a condition to match to the user object before sending or initiating the tour 280. When the condition is matched, the tour 280 is initiated on the end user device 118 associated with the user object and the user object is advanced to the tag 290. When the user object is advanced to the tag 290, the user object is tagged with data associated with the user path 200 and the user path 200 is completed by the user object.

Figure 3:
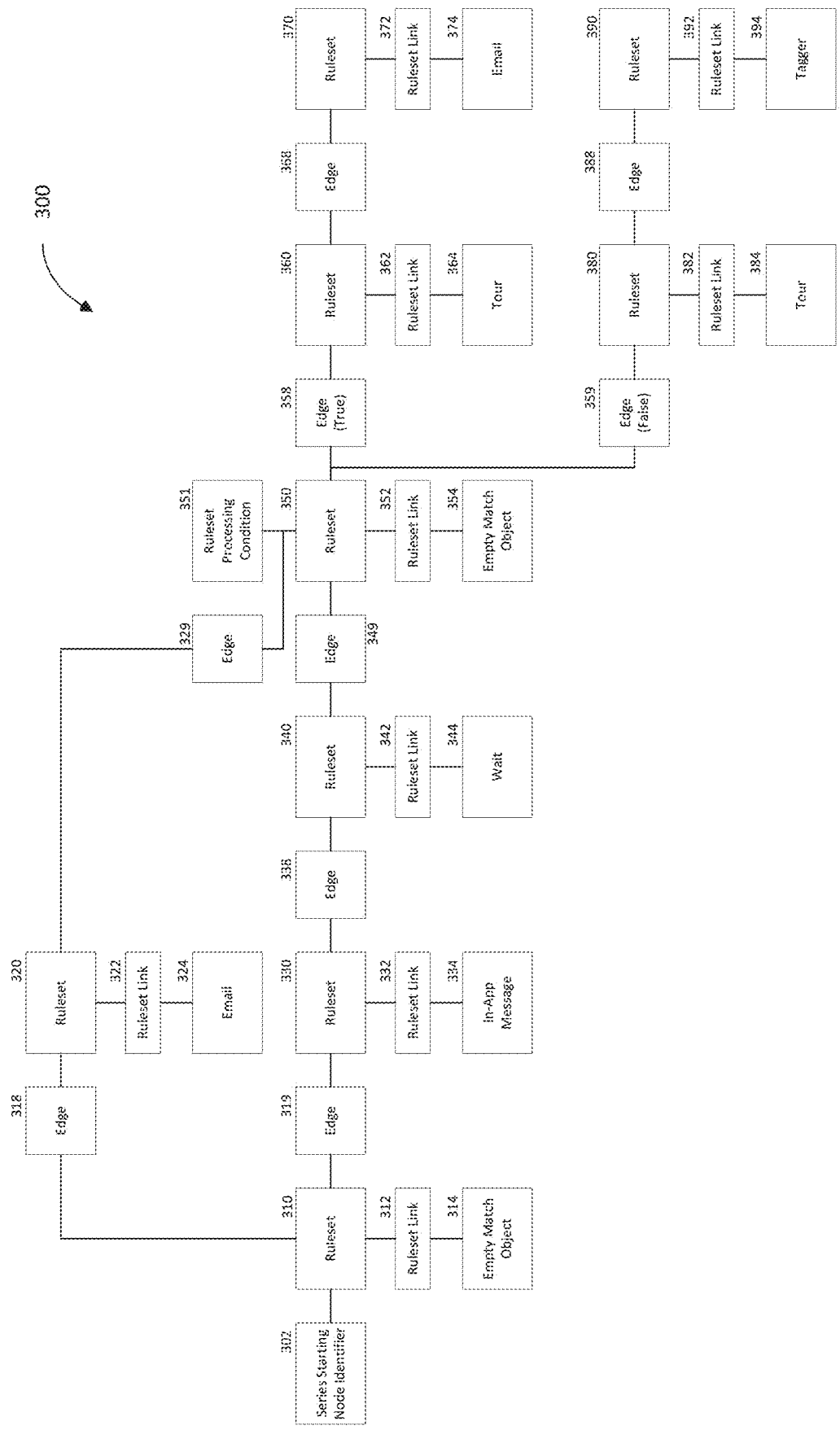
FIG. 3 is a block diagram of an example data model to execute the user path of FIG. 2, according to some embodiments.

FIG. 3 is a block diagram of an example data model 300 to execute the user path 200 of FIG. 2. The data model 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, one or more of the operations of data model 300 may be performed by the communication system 102, the customer device 116, the end user device 118, and/or the third party system 120 of FIG. 1A. In some embodiments, the data model 300 may be executed on the processing device 152*a* of the messaging platform 110 of FIG. 1B. Some aspects of performing the data model 300 may be described in further detail below.

The data model 300 has a plurality of nodes and edges that are traversed by a user object as the user object is advanced through the data model 300 and thus, is advanced through the user path. The nodes of the data model 300 may represent corresponding tasks of the user path 200 with the leading "2" of the user path 200 replaced with a leading "3" for the corresponding node of the data model 300. The nodes described below include, but are not limited to, condition blocks, content blocks, and action blocks. A condition block is a node in which a user associated with a user object is required to match one or more criteria of a ruleset. Condition blocks generally do not have content or actions associated therewith. A content block is a node that has content associated with that which is delivered to the user object when the user object matches the content block. An action block is a node in which an action associated therewith is performed when a user object matches with the action block, e.g., tag the user block.

The user object may be placed in and advanced through the data model 300 by a foreground matching system and/or a background matching system of the messaging platform 110. The foreground matching system and the background matching system may be described in greater detail below. For the purposes of the data model 300, the foreground matching system may be a system or process that matches a user object with rules or conditions that require an end user device 118 related to the user object to be engaged with or interfacing with a product. The background matching system may be a system or process that matches a user object with rules or conditions that can be matched without the end user device 118 related to the user object being engaged with or interfacing with the product. The background matching system may match user objects when the end user device 118 related to the user object is idle or is not engaged with the product or when the end user device 118 is engaged with or interfacing with the product.

The data model 300 includes a first node 310 that is linked to starting node identifier 302 which allows the foreground matching system and/or the background matching system to match user objects to the first node 310 to place matching user objects at the first node 310. The foreground matching system and/or the background matching system may be executed by the processing device 152*a* of the communication system 102. For example, the user object may be matched and placed at the first node 310 by the processing device 152*a*.

Figure 4:
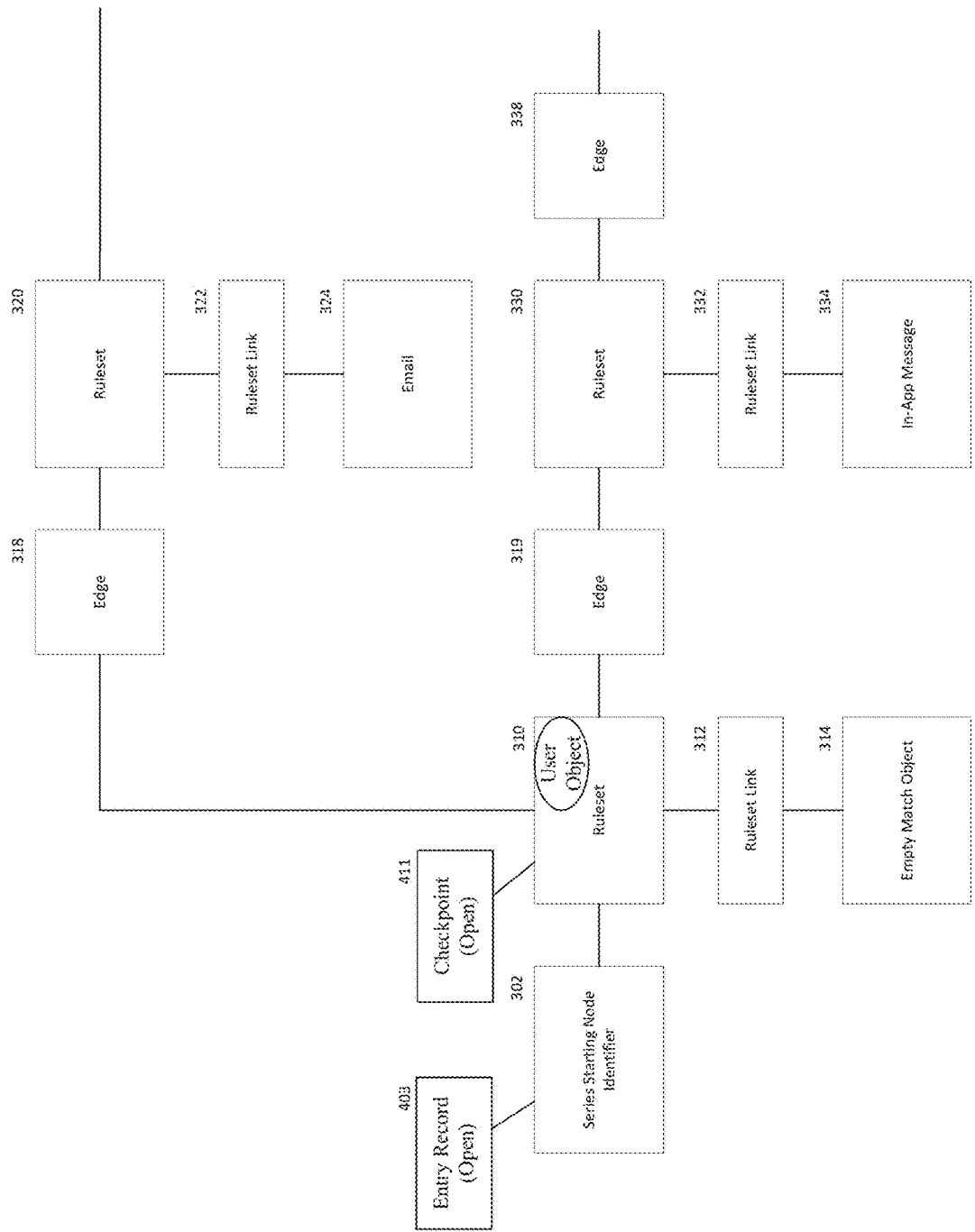
FIG. 4 is an enlarged portion of the block diagram of FIG. 3 with a user object placed at a first node thereof, according to some embodiments.

With reference to FIG. 4 which is an enlarged portion of the block diagram of FIG. 3 with a user object placed at the first node 310 thereof, according to some embodiments. When the user object is placed at the first node 310, an entry record 403 for the starting node identifier 302 is created for the user object and a checkpoint 411 for the first node 310 is created for the user object. The entry record 403 and the checkpoint 411 may be created by the foreground matching system, e.g., processing device 152*a*. In some embodiments, the entry record 403 or the checkpoint 411 may be created by the background matching system. The checkpoint may be a database record that records that a user object requires processing at a node or that the user has previously visited a node in the data model 300. The checkpoints may include a status field including, but not limited to, "Active", "Completed", or "Expired".

The user object is placed at the first node 310 as a result of matching conditions of the first node 310. In some embodiments, the first node 310 may have a task 314 associated with the first node 310. The task 314 may be linked to the first node 310 by a ruleset link 312. When the first node 310 is matched, the ruleset link 312 initiates or processes the task 314. In some embodiments, the task 314 may be completed by the processing device 152*a*, a third party system 120, or the customer device 116. As shown, the task 314 is a "Condition" or empty object such that no task 314 is completed when the condition or ruleset of the first node 310 is matched. In certain embodiments, creation of the entry record 403 prevents the user object from rematching or reentering the data model 300 and thus, the user path 200.

In response to completion of the task 314 of the first node 310, the entry record 403 is created, the checkpoint 411 is created, the user object is advanced along any edges extending from the first node 310, and the checkpoint 411 is marked as complete. The foreground matching system may advance the user object and/or complete the checkpoint 411. In some embodiments, the background matching system may advance the user object and/or complete the checkpoint 411.

Figure 5:
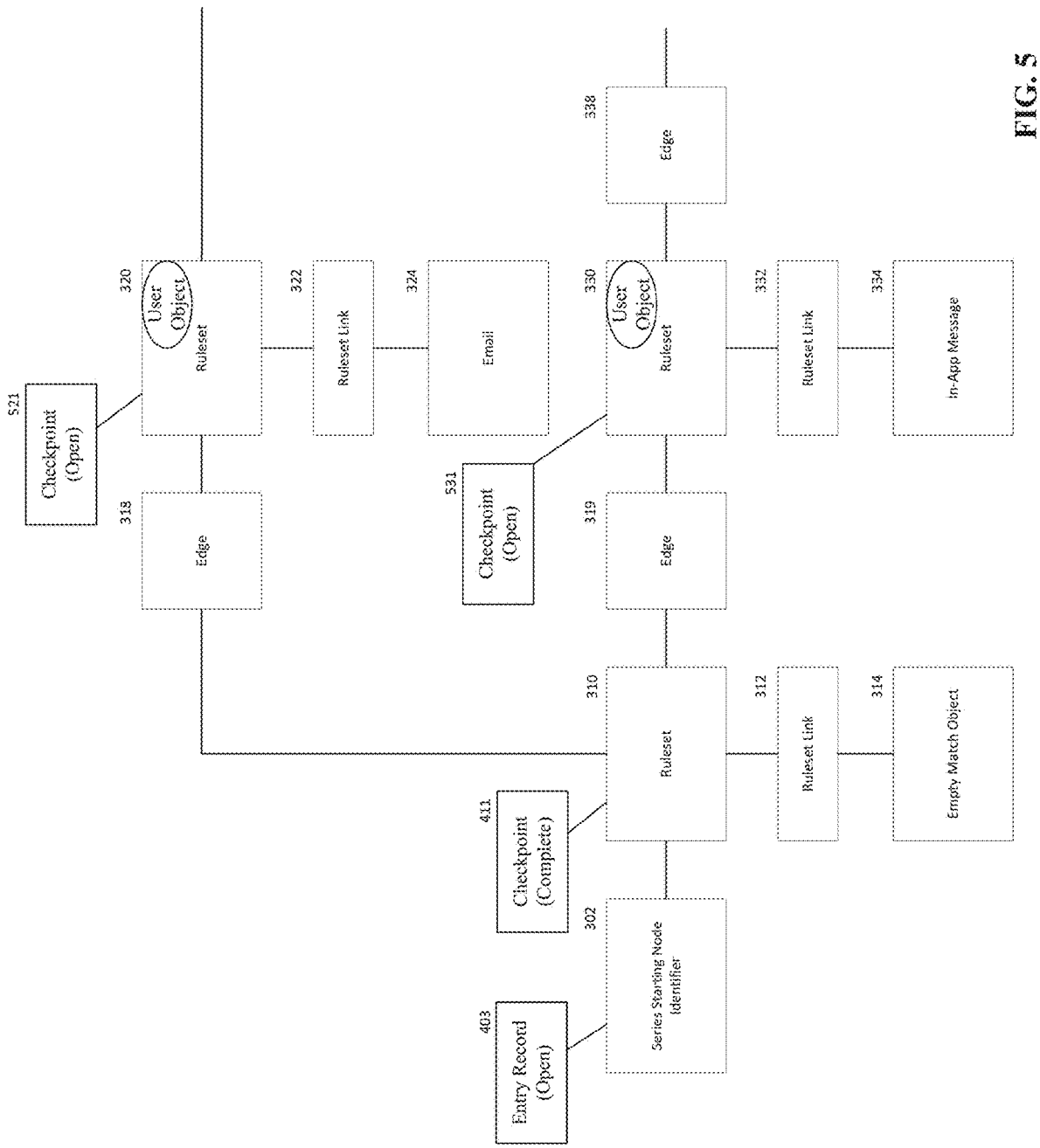
FIG. 5 is the enlarged portion of the block diagram of FIG. 4 with the user object advance to a second node and a third node of the data model, according to some embodiments.

With reference to FIG. 5, the enlarged portion of the block diagram of FIG. 3 is shown with the user object advanced from the first node 310, according to some embodiments. As shown, the user object is advanced along edge 318 to a second node 320 and along edge 319 to a third node 330. As such, the user object is at two positions within the data model 300, e.g., second node 320 and third node 330. When the user object arrives at the second node 320, a checkpoint 521 for the second node 320 is created and when the user object arrives at the third node 330, a checkpoint 531 for the third node 330 is created. As shown, the foreground matching system creates the checkpoints 521, 531. In some embodiments, the background matching system may create the checkpoint 521 or the checkpoint 531. The checkpoints 521, 531 may be indicative of or a signal to the foreground or background matching system that a ruleset of the second node 320 and the third node 330 is ready to be processed. In response to the creation of the checkpoints 521, 531, the foreground matching system may be completed with an insertion of the user object into the data model 300.

Figure 6:
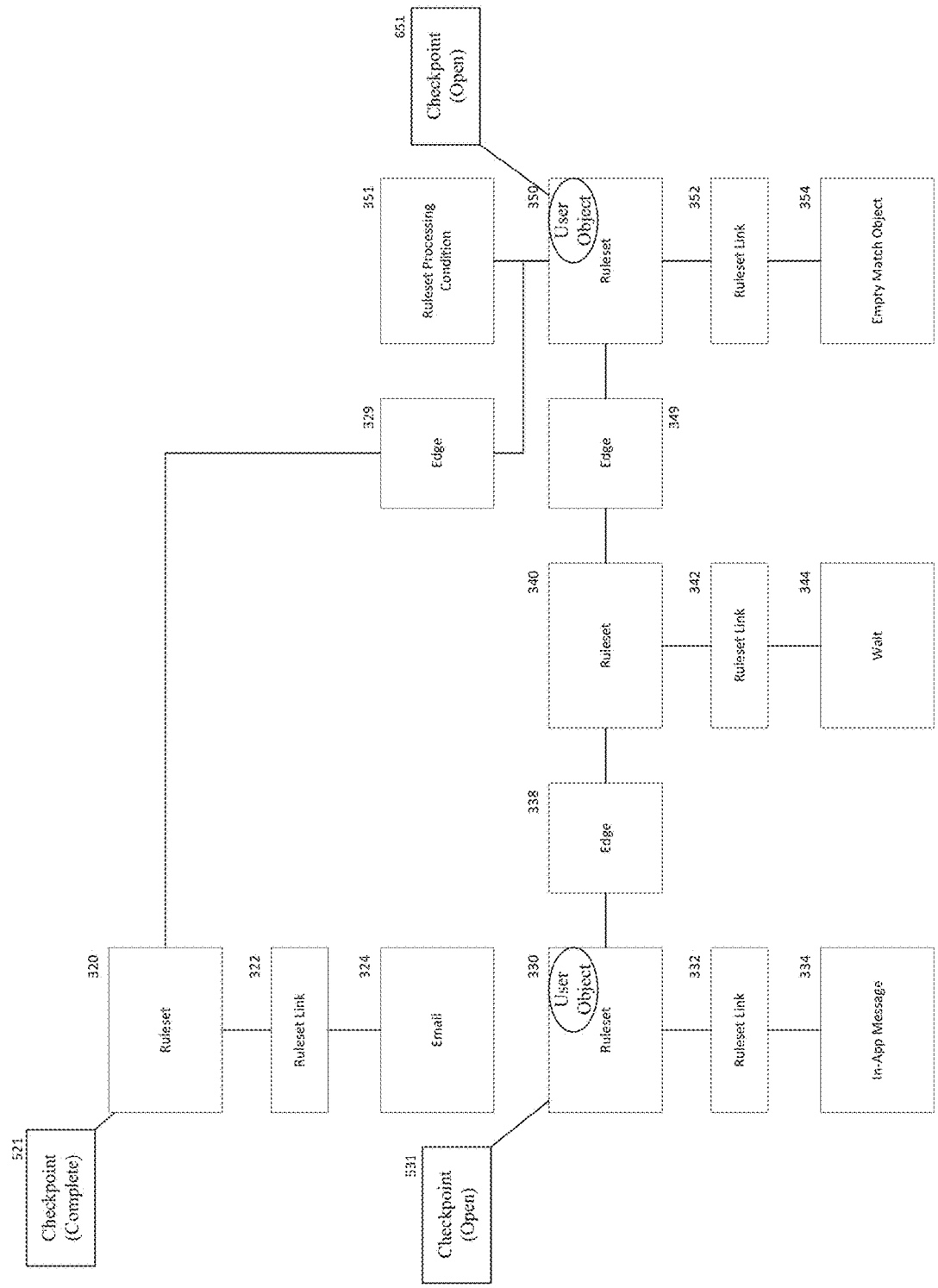
FIG. 6 is an enlarged portion of the block diagram of FIG. 3 with the user object advanced to a fifth node, according to some embodiments.

Referring to FIG. 6, another enlarged portion of the data model 300 is shown with the user object advanced from the second node 320 to a fifth node 350. The user object may be advanced from the second node 320 when a background matching system recognizes the checkpoint 521 as ready to be matched or be processed. The background matching system may match the user object against the ruleset of the second node 320. When the user object matches the ruleset of the second node 320, a ruleset link 322 is initiated to perform the task 324 associated with the second node 320. As shown, the task 324 is sending an email to an end user device 118 associated with the user object. The email may be sent by the processing device 152a or a third party system 120. In response to the email being sent, the user object is advanced along edge 328 to the fifth node 350 and the checkpoint 521 is marked as complete for the user object. When the user objet reaches the fifth node 350, a checkpoint 651 is created for the fifth node 350. The background matching system is complete with the job related to the match of the second node 320 when the user object is advanced to the fifth node 350, the checkpoint 521 is completed, and the checkpoint 651 is created. The checkpoint 651 may be indicative of or signal to the foreground or background matching system that a ruleset of the fifth node 350 is ready to be processed. In some embodiments, a foreground matching system may match the ruleset of the second node 320 or mark the checkpoint 521 complete.

When the user object does not match the ruleset of the second node 320, the matching system, e.g., the foreground matching system or the background matching system, leaves the user object at the second node 320 and the checkpoint 521 open for the same or another subsequent matching system to retry the match.

Figure 7:
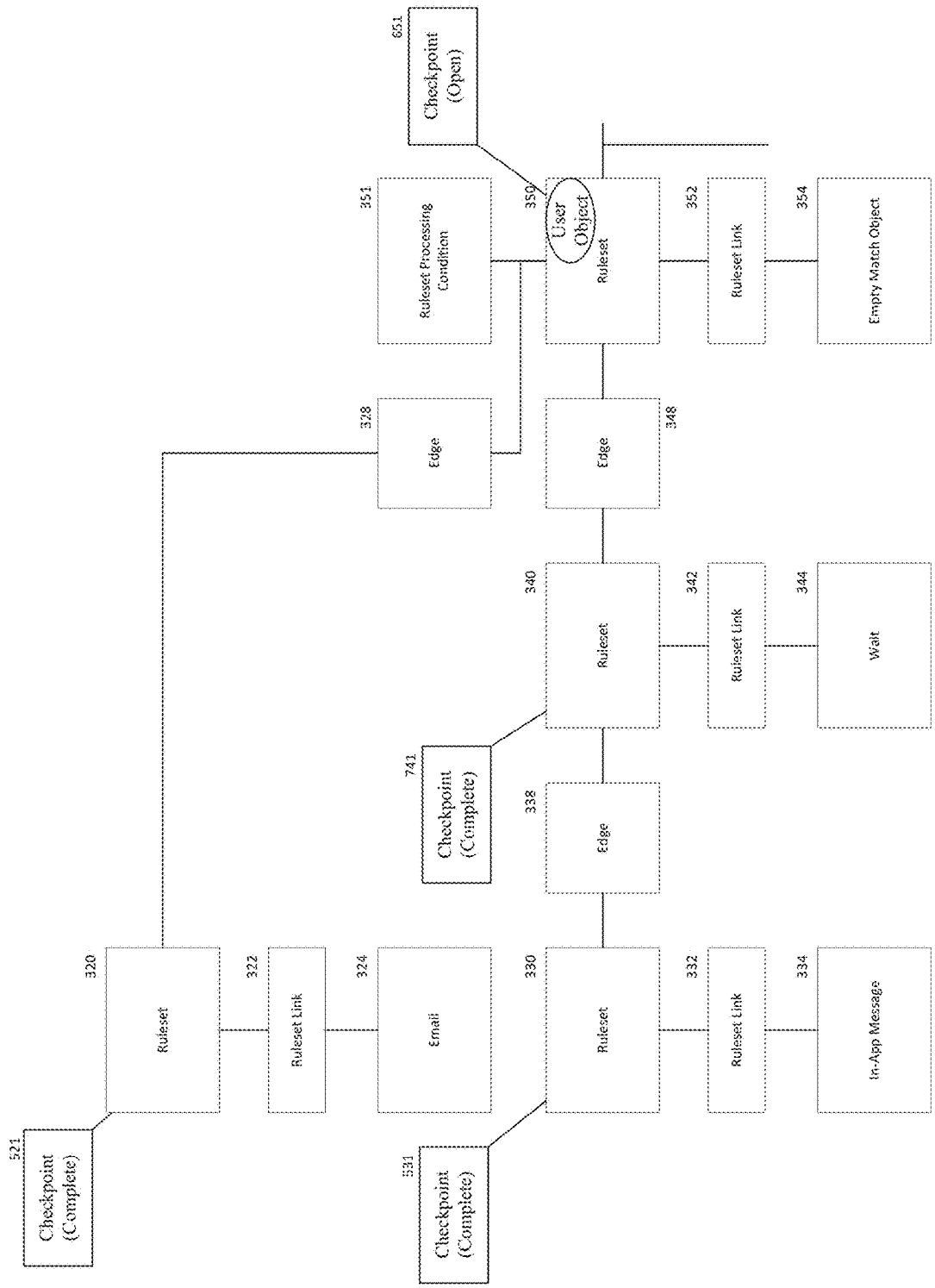
FIG. 7 is the enlarged portion of the block diagram of FIG. 6 with the user object advanced from the third node, through the fourth node, and to the fifth node, according to some embodiments.

FIG. 7 is the portion of the block diagram of FIG. 6 with the user object advanced from the third node 330, through the fourth node 340, and to the fifth node 350. A foreground or background matching system may match the ruleset of the third node 330 with the user object. As shown, the ruleset of the third node 330 may include a rule that the end user device 118 related to the user object is engaged with the product such that a foreground matching system is required to match the ruleset of the third node 330. In response to the ruleset of the third node 330 being matched, a ruleset link 332 is initiated to perform the task 334 associated with the third node 330. As shown, the task 334 is sending an in-app message to the end user device 118 associated with the user object. The in-app message may be a banner, a pop-up, or a chat message sent by the processing device 152a or a third party system 120. In response to the in-app message being sent, the user object is advanced along edge 338 to the fourth node 340 and the checkpoint 531 is marked as complete for the user object. When the user object reaches the fourth node 340, a checkpoint 741 is created for the fourth node 340. The foreground matching system is complete with the job related to the match of the third node 330 when the user object is advanced to the fourth node 340, the checkpoint 531 is completed, and the checkpoint 741 is created. The checkpoint 741 may be indicative of or signal to the foreground or background matching system that a ruleset of the fourth node 340 is ready to be processed.

A foreground or background matching system may match the ruleset of the fourth node 340 with the user object. As shown, the ruleset of the fourth node 340 may be a waiting period. When the checkpoint 741 is created, the waiting period may be written into the checkpoint 741. As such, the ruleset of the fourth node 340 may be processed by the background matching system when the checkpoint 741 is processed. When the ruleset of fourth node 340 is completed or matched, a ruleset link 342 is initiated to perform the task 344 associated with fourth node 340. As shown, the task 344 is a delay or waiting period such that the user object may be advanced after the delay or waiting period is completed or elapsed. In response to the waiting period elapsing, the user object is advanced along edge 348 to the fifth node 350 and the checkpoint 741 is marked as complete for the user object. When the user object reaches the fifth node 350, a checkpoint may be created for the fifth node 350.

In some embodiments, the user object may arrive at the fifth node 350 before the user object traverses the edge 328 or the edge 348. In such embodiments, the user object may merge with the previous user object at the fifth node 350. In some embodiments, the fifth node 350 may have been completed before the user object traverses the edge 328 or the edge 348 as indicated by the completion of the checkpoint 651. When the checkpoint 651 is completed when a user object arrives at the fifth node 350, that user object may be removed from the data model 300.

Figure 8:
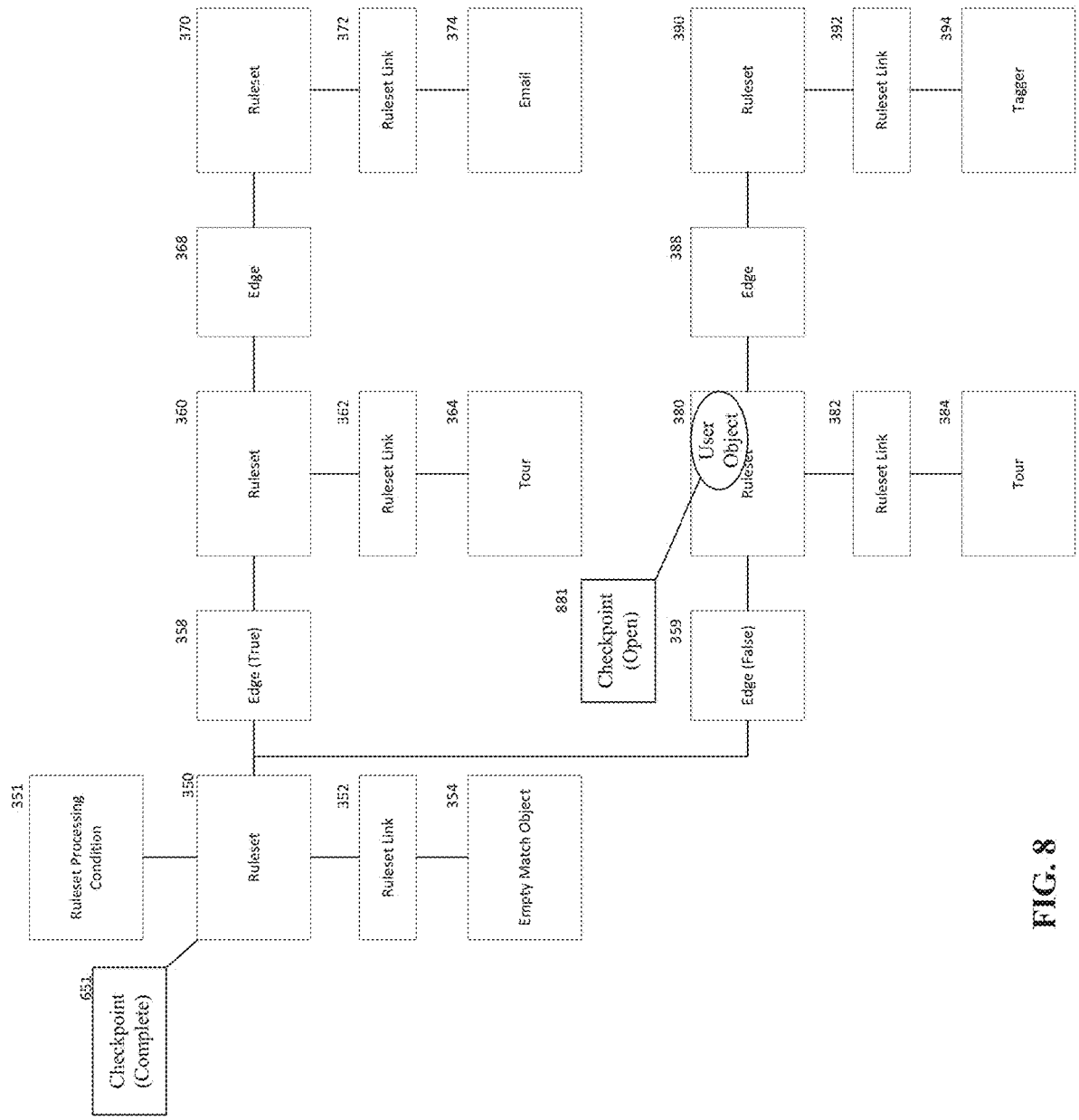
FIG. 8 is an enlarged portion of the block diagram of the data model of FIG. 3 with the user object advanced to the eighth node, according to some embodiments.

With reference to FIG. 8, an enlarged portion of the block diagram of the data model 300 with the user object advanced from the fifth node 350 along the false edge 359 to the eighth node 380. The background matching system may attempt to match the ruleset of the fifth node 350. The fifth node 350 includes a ruleset processing condition 351, a true edge 358, and a false edge 359. When the background matching system matches the ruleset of the fifth node 350, a ruleset link 352 is initiated to perform the task 354 associated with the fifth node 350. As shown, the task 354 is an empty match object or placeholder such that no additional task is completed and the user object is advanced from the fifth node 350. In response to the task 354 being completed, the user object is advanced along the true edge 358 to the sixth node 360 and the checkpoint 651 is marked as completed and a new checkpoint (not shown) for the sixth node 360 is created.

In contrast when the background matching system fails to match the ruleset of the fifth node 350, the background matching system processes the ruleset matching condition 351. In embodiments, the ruleset matching condition 351 may be a repeat of a check for a match of the ruleset of the fifth node 350 at an interval for an amount of time. In the example shown, the ruleset matching condition 351 is a repeat of a check for a match of the ruleset of the fifth node 350 every day for seven days. When match of the ruleset of the fifth node 350 fails for the intervals for the amount of time, the user object is advanced along the false edge 359 to the eighth node 380, the checkpoint 651 is marked as complete, and a checkpoint 881 for the eight node is created.

The sixth node 360 and the eighth node 380 are processed in a manner similar to the other nodes detailed above and will not be detailed for reasons of brevity. When the sixth node is completed, the user object is advanced to the seventh node and when the eighth node 380 is competed the user object is advanced to the ninth node 390. When seventh node 370 or the ninth node 390 is completed, a checkpoint for the respective node 370, 390 is completed and the entry record 403 (FIG. 4) is completed.

As noted above, as the user object is advanced through the data model 300, the foreground matching system and/or the background matching system create an entry record 403 and checkpoints, e.g., checkpoints 411, 521, 531, 651, 741, 881, to track and record progress of the user object through the data model 300. As detailed above, when the user object reaches a node, the respective matching system creates an open checkpoint such that the open checkpoint is considered active. When a checkpoint is active, the respective matching system identifies a job related to the active checkpoint and places the active checkpoint in a job queue to be processed. Checkpoints may have an expiry time or an expiry duration. Once a checkpoint expires without a task associated with the checkpoint being completed, a user object may be advanced across an edge from the node associated with the checkpoint, e.g., a false edge, or a user object may be removed from the user path.

When an active checkpoint is processed, the user object may be advanced to a subsequent node or the active checkpoint may be updated to be processed later, e.g., when the checkpoint is for a node that includes a delay or wait period. When the user object reaches an end of the data model 300, e.g., when all checkpoints are completed or a task includes completion of the entry record, the foreground matching system and/or the background matching system completes the entry record 403 (FIG. 4). When the entry record 403 is completed, the user object is prevented from rematching or reentering the data model 300 and/or the user path 200.

Figure 9:
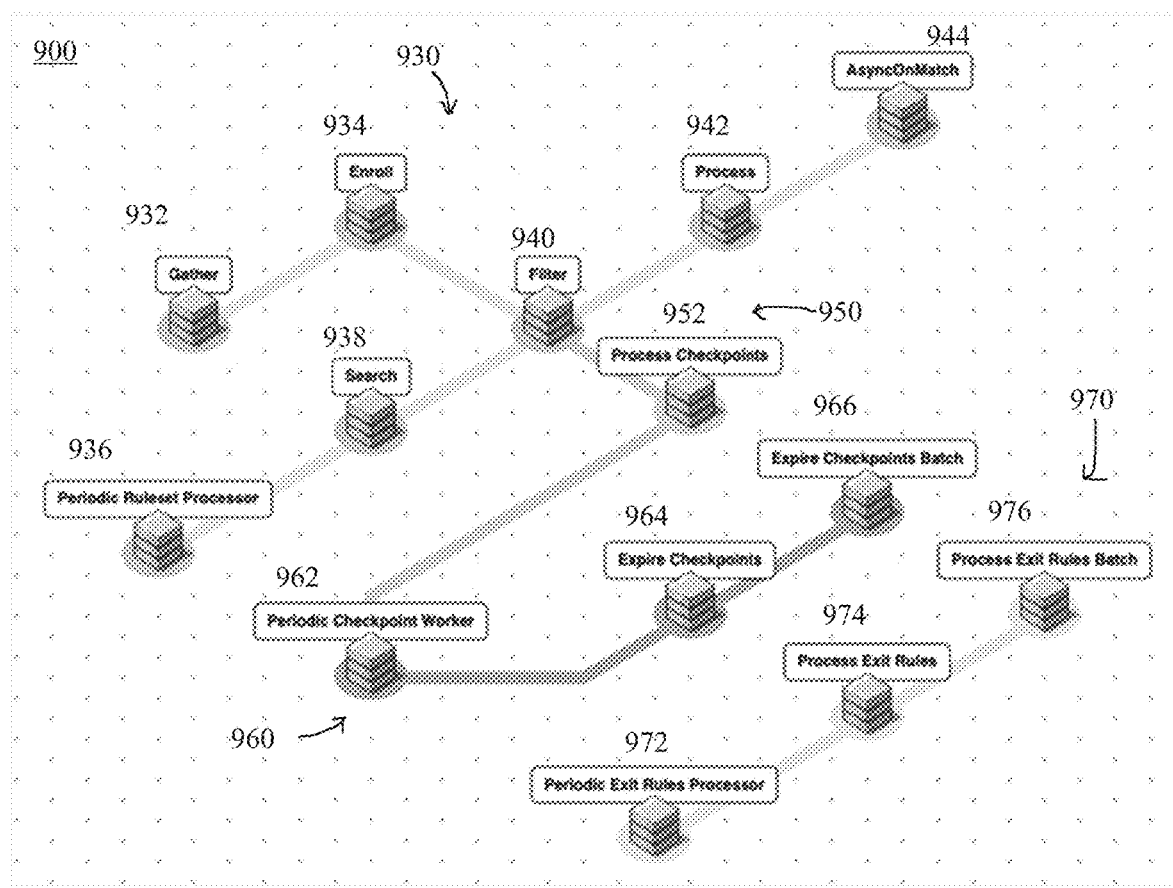
FIG. 9 is diagram of a background matching system 300 of the communication system 102 in FIG. 1 that references the user path in FIG. 2, according to some embodiments.

FIG. 9 is diagram of a background matching system 900 of the communication system 102 in FIG. 1 that references the user path 200 in FIG. 2, according to some embodiments. The background matching system 900 may be a system or process that matches a user object with rules or conditions that can be matched without the end user device 118 related to the user object being engaged with or interfacing with a product. The background matching system 900 may match user objects when the end user device 118 related to the user object is idle or is not engaged with the product or when the end user device 118 is engaged with or interfacing with the product.

As detailed above with respect to the user path 200 and the data model 300, the background matching system 900 may identify user objects that match a rule set and place the user object within a user path 200. In some embodiments, the background matching system 900 may advance a user object through a user path 200 or a data model 300. The background matching system 900 may reside in a memory 154a of the messenger platform 110 (FIG. 1B) and be executed on the processing device 152a.

The background matching system 900 includes a matching pipeline that includes stations or workers 932-976. The workers 932-976 work together to place user objects into user paths, advance user objects through user paths, and to remove user objects from user paths. As shown, the background matching system 900 includes a fleet of fourteen workers 932-976. In some embodiments, background matching system 900 may include less than or more than fourteen workers 932-976. The fourteen workers 932-976 process user objects to place the user objects in user paths, e.g., user path 200, and to process the user objects through user paths. The fourteen workers 932-976 may determine a correct channel to send content, may match a user object to content, and may confirm the content is in a valid state before sending. In embodiments, one or more of the workers 932-976 may use negative matching to efficiently remove user objects from a user path or prevent a user object from advancing within a user path to allow for more efficient processing of user objects. Negative matching may include matching a user object to a ruleset and removing the user object from a user path based on being matched to the ruleset. Each worker 932-976 may represent one or more applications or processes being executed on one or more processing devices. One or more of the workers 932-976 may be stored in the memory 154a of the communication system 102 and/or may be executed on the processing device 152a of the communication system 102.

Continuing to refer to FIG. 9, the function of each of the workers 932-976 of the background matching system 900 is described in detail. The first group of workers 932-944 may be grouped together as an entry worker fleet 930 that identifies and places user objects into user paths based on static or dynamic audience rules. Static audience rules being based on attributes or tags of a user object at that moment such that users who match the rules in the future are not selected whereas a dynamic audience rule is based on attributes or tags of a user object at that moment and may continue to match additional users in the future that match the dynamic audience rule.

The gather worker 932 is a static audience or static matching worker that matches user objects based on fixed tags or relatively fixed tags of the user object. The gather worker 932 uses an elastic search to identify user objects from all user objects that currently match one or more attributes of a ruleset or entry condition of a user path 200 to identify potential user objects for a user path, e.g., user path 200. In certain embodiments, the gather worker 932 may match tags of a user object that may prescreen or filter a user object for a more detailed ruleset for entry into a user path. The gather worker 932 may pass the identified user objects to a subsequent worker, e.g., the enroll worker 934. In some embodiments, the gather worker 932 passes identified user objects to the subsequent worker in batches of identified user objects in a range of 100 to 10,000 user objects, e.g., 1,000 user objects.

The enroll worker 934 may receive the identified user objects from the gather worker 932. The identified user objects may be received in batches. When the enroll worker 934 receives an identified user object, whether alone or in a batch, the enroll worker 934 creates a "StaticAudienceMembership" record for each identified user. After creation of the "StaticAudienceMembership" record, the enroller worker 934 may pass the identified user objects to another worker, e.g., a filter worker 940.

The periodic ruleset processor worker 936 identifies dynamic rulesets to search user objects to identify user objects to place into user paths. The periodic ruleset processor worker 936 may search for active or live rulesets as rulesets. Rulesets may have a state of draft, live, paused, and/or expired with only live rulesets being searched by the periodic ruleset processor worker 936. The periodic ruleset processor worker 936 may pass a portion of the live rulesets to another worker to search for user objects that match the live rulesets. For example, the periodic ruleset processor worker 936 may pick up $\frac{1}{60}^{th}$ of all live rulesets each minute and pass the rulesets to a subsequent worker, e.g., a search worker 938. The periodic ruleset processor worker 936 may gather all live rulesets and may reject any rulesets that are for internal series nodes, e.g., nodes that are not entry nodes.

The search worker 938 is a dynamic audience or dynamic matching worker that matches user objects based on current tags or current status of the user object. The search worker 938 receives the rulesets from the periodic ruleset processor worker 936 and identifies user objects that meet each of the live rulesets provided by the periodic ruleset processor worker 936. The tags matched by the search worker 938 may be tags that change over time or dynamic tags. The search worker 938 may use an elastic search to identify user objects from all user objects that currently match one or more attributes of a ruleset or entry condition of a user path 200 as a preliminary filter to identify potential user objects for a user path, e.g., user path 200. In certain embodiments, the search worker 938 may match tags of a user object that may prescreen or filter a user object for a more detailed ruleset for entry into a user path. The search worker 938 may pass the identified user objects to a subsequent worker for further processing, e.g., the filter worker 940. In some embodiments, the search worker 938 passes identified user objects to the subsequent worker in batches of identified user objects in a range of 100 to 10,000 user objects, e.g., 1,000 user objects.

The filter worker 940 receives batches of user objects from the enroll worker 934 and/or the search worker 938. The filter worker 940 does additional matching of the user objects received from the enroll worker 934 or the search worker 938 to filter identified user objects. The filter worker 940 may remove user objects that have one or more attributes and/or may remove users that have one or more attributes including, but not limited to, those detailed below. The filter worker 940 may filter user objects based on rules of a ruleset and/or an entry condition for a user path. The filter worker 940 may filter user objects that have been previously matched with a user path. For example, the filter worker 940 may check for an entry record into a particular user path to prevent a user object from reentering a user path. The filter worker 940 may verify that a user object is eligible to match a particular rule set at the current time, e.g., verify that the time is within a current time range (9 am-5 pm) in the time zone associated with the user object. The eligibility of the user object may be checked for both static audience matches and dynamic audience matches. The filter worker 940 may check a ruleset within a user path to determine if the user object does not already match an exit rule for the user path. In some embodiments, the filter worker 940 may determine if a current company is a priority company for the user object. Examples of company prioritization may be found in U.S. Pat. No. 11,403,426, the entire contents of which are hereby incorporated by reference. In some embodiments, the filter worker 940 may identify a "StaticAudienceMembership" to pass the user object to a subsequent worker. A user object with a "StaticAudienceMembership" may be filtered or delayed based on a time within a time zone associated with the user object, e.g., to prevent messages outside a time window such as 9 am-5 pm in a time zone associated with the user object.

The filter worker 940 may pass user objects to a process server 942. The filter worker 940 may pass user objects in batches in a range of 10 user objects to 1,000 user objects, e.g., 100 user objects.

The process worker 942 receives user objects from the filter worker 940. The filter worker 940 may receive the user objects from the process worker 942 in a batch. The process worker 942 creates or updates a "Match Record" for each user object. The "Match Record" includes content or user paths that the user object has matched or received previously. The "Match Record" may prevent rematching of a user object with content. In some embodiments, the "Match Record" may prevent rematching of a user object with content for a predetermined amount of time. The process worker 942 may invoke an "on_match" method with a piece of content linked to a ruleset. For example, a mobile push message attached to a ruleset would send a push message to an end user device, e.g., end user device 118 or a tag attached to a ruleset is applied to tag a user object upon match.

The process worker 942 may pass user objects to the AsyncOnMatch worker 944. In some embodiments, the filter worker 940 may pass user objects to the AsyncOnMatch worker 944. The AsyncOnMatch worker 944 may be used when content may require more resilience to failure than others. For example, when content is provided to a user object via a third party system or program as a result of a match, then the AsyncOnMatch worker 944 may receive the user object and a ruleset from the process worker 942 or the filter worker 940. The AsyncOnMatch worker 944 may provide content "on_match" and communications with a third party system to provide content to the user object. The AsyncOnMatch worker 944 may receive individual user objects and rulesets to provide content to the user object on match. The AsyncOnMatch worker 944 may receive a confirmation of content delivery before completing a ruleset. In some embodiments, the AsyncOnMatch worker 944 may reattempt or reconfirm delivery after a delay to confirm that content was provided to a user object.

The process worker 942 and/or the AsyncOnMatch worker 944 may process a ruleset by matching the user object to the ruleset. When the ruleset is matched, the worker 942, 944 advances the user object along any "truthy edges" or "true edges" and create new checkpoints as the user object is advanced. When the ruleset is not matched, the worker 942, 944 advances the user object along any "falsey edges" or "false edges" and create new checkpoints as the user object is advanced. In some embodiments, when a rule set is not matched and no "falsey edges" exist to take, worker 942, 944 completes an entry record for user path. In certain embodiments, when the ruleset is not matched, the worker 942, 944 follows a processing condition to snooze the ruleset/checkpoint for a period of time defined by the processing condition before attempting to match the ruleset again. In particular embodiments, when the ruleset is matched there is a delivery window for content or a delay condition, the worker 942, 944 snoozes the checkpoint until the delivery window is open or the delay condition is met before attempting to match the ruleset again.

As described above, the sub-fleet 930 of workers 932-944 identifies user objects, filters the identified user objects, and processes the filtered and identified user objects through nodes of a user path, e.g., user path 200. The other workers shown in FIG. 9, check and process user objects based on checkpoints within paths to advance user objects through user paths, remove user objects from user paths, and complete or exit user objects from user paths as detailed below.

The periodic checkpoint worker 962 runs periodically and processes a percentage or a fraction of applications that have active checkpoints. For example, the periodic checkpoint worker 962 may run every minute and process $\frac{1}{5}^{th}$ or 20 percent of all applications with each run such that every application is processed every five minutes. The period and percentage of applications may vary based on the number of checkpoints, the number of applications, the number of user paths, and/or the number of user objects being processed. In some embodiments, the period and percentage of applications for reach run may vary to improve overall system performance.

The periodic checkpoint worker 962 performs at least two tasks. First, the periodic checkpoint worker 962 identifies checkpoints within user paths that are expired and passes the expired checkpoints to the expire checkpoints worker 964. Second, the periodic checkpoint worker 962 identifies checkpoints that are active and are processable. The periodic checkpoint worker 962 passes the identified active and processable checkpoints to the process checkpoints worker 952.

The periodic checkpoint worker 962 identifies checkpoints by processing applications associated with the user paths. For each application, the periodic checkpoint worker 962 checks to identify if the application has any active checkpoints. If the application does not have any active checkpoints, the periodic checkpoint worker 962 updates the application to be checked such that the application is not included in future periodic checks. This update of the application may be an atomic update through all app-level models to exclude the application from all future periodic checks. In some embodiments, the atomic update may occur after a certain number of consecutive checks in which the application did not have any active checkpoints. For each application, when there are active checkpoints, the periodic checkpoint worker 962 creates and queues a job to expire any expired checkpoints and passes the identified expired checkpoints to the expire checkpoints worker 964. In addition, the periodic checkpoint worker 962 creates and queues a job to process any processable checkpoints for the application and passes the processable checkpoints to the process checkpoints worker 952.

The process checkpoints worker 952 receives checkpoints from the periodic checkpoint worker 962 and ques batches of checkpoints for the filter worker 940. In some embodiments, the process checkpoints worker 952 builds batches of checkpoints by a ruleset for the checkpoints such that each batch of checkpoints have the same or a similar ruleset. The process checkpoints worker 952 passes the patches of checkpoints to the filter worker 940 such that the filter worker filters and passes the batches of checkpoints to the process worker 942 or the AsyncOnMatch worker 944 as detailed above.

The expire checkpoints worker 964 receives expired checkpoints from the periodic checkpoint worker 960 and builds batches of expired checkpoints for the expire checkpoints batch worker 966. The expire checkpoints worker 964 may group expired checkpoints by app in each batch such that each batch of checkpoints passed to the expire checkpoints batch worker 966 are from a single application. The expire checkpoints worker 964 creates a job and places the job in a queue for the expire checkpoints batch worker 966 to process. The expire checkpoints worker 964 may provide batches including an application and checkpoints associated with the application.

The expire checkpoints batch worker 966 receives jobs to expire batches of checkpoints from the expire checkpoints worker 964. The expire checkpoints batch worker 966 process the checkpoints in each queue by expiring the checkpoint and advancing the user object along any alternative edges associated with the node of the checkpoint, e.g., advance the user object along any false edges associated with the node as detailed above. The expire checkpoints batch worker 966 may expire the checkpoint and remove the user object from the respective user path.

The periodic exit rules processor worker 972 runs periodically and process a percentage or a fraction of applications that have active checkpoints. For example, the periodic exit rules processor worker 972 may run every five minutes and process $1/12^{th}$ or 8 percent of all applications with each run such that every application is processed every hour. The period and percentage of applications may vary based on the number of checkpoints, the number of applications, the number of user paths, and/or the number of user objects being processed. In some embodiments, the period and percentage of applications for each run may vary to improve overall system performance. Specifically, removing expired checkpoints may increase a performance of the worker fleet 900 by reducing a number of active checkpoints.

The periodic exit rules processor worker 972 identifies each node with active checkpoints and creates a job for the process exit rules worker 974 for each node. The process exit rules worker 974 gathers the active checkpoints by node and creates batches of active checkpoints for the process exit rules batch worker 976. A batch of active checkpoints may include all active checkpoints within a user path, an application, or a single node. When the process exit rules batch worker 976 receives a batch of active checkpoints, the process exit rules batch worker 976 matches user objects at the checkpoints with exit rules of the user path. When a user object matches the exit rules of the user path, the process exit rules batch worker 976 removes the user object from the user path and updates an entry record of the user object for the user path. When the user object does not match the exit rules of the user path, the process exit rules batch worker 976 moves on to the next user object. Removing user objects that match the exit rules may increase a performance of the worker fleet 900 by removing user objects from user paths. Removing user objects from user paths may reduce a number of active checkpoints in a system.

As noted above, the foreground matching system may interact with the background matching system. For example, the foreground matching system may receive checkpoints from the filter worker 940 that require engagement from a user object such as initiating a chat with the user object or providing a pop-up message. In embodiments, the foreground matching system may identify user objects interacting with a product and provide the identified user objects to the gather worker 932 or the enroll worker 934.

The foreground matching system may prioritize condition blocks over other blocks in a data model, e.g., data model 300. For example, the foreground matching system may prioritize checkpoints associated with condition blocks over checkpoints associated with content blocks or action blocks. Prioritizing condition blocks may prevent undesired delays or interactions within the user object. Prioritizing condition blocks may allow for rulesets for checkpoints of content blocks and/or action blocks to be matched alongside one another.

Figure 10:
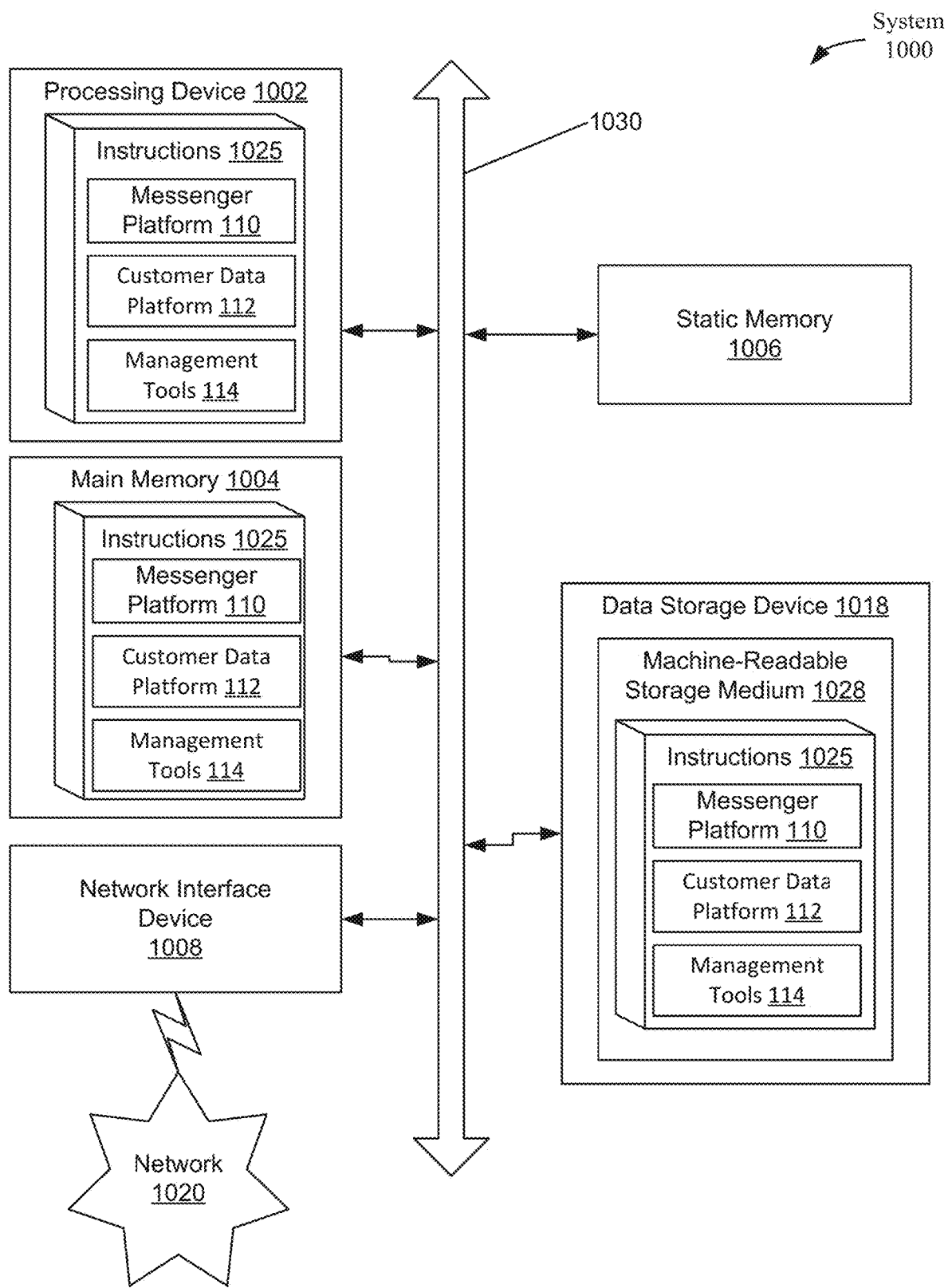
FIG. 10 is a block diagram of an example computing device 500 that may perform one or more of the operations described herein, according to some embodiments.

FIG. 10 is a block diagram of an example computing device 1000 that may perform one or more of the operations described herein, in accordance with some embodiments. Computing device 1000 may be connected to other computing devices in a LAN, an intranet, an extranet, and/or the Internet. The computing device may operate in the capacity of a server machine in a client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. In some embodiments, while only a single computing device is illustrated, the term "computing device" may be taken to include any collection of computing devices that individually or jointly execute a set (or multiple sets) of instructions to perform the methods discussed herein.

The example computing device 1000 may include a processing device (e.g., a general purpose processor, a PLD, etc.) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

Processing device 1002 may be provided by one or more general-purpose processing devices such as a microprocessor, central processing unit, or the like. In an illustrative example, processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1002 may comprise one or more special-purpose processing devices such as an application specific integrated circuit (ASIC), a field programmable gate array (FPGA), a digital signal processor (DSP), network processor, or the like. The processing device 1002 may be configured to execute the operations described herein, in accordance with one or more aspects of the present disclosure, for performing the operations and steps discussed herein.

Computing device 1000 may include a network interface device 1008 which may communicate with a communication network 1020. The computing device 1000 may include a video display unit (e.g., a liquid crystal display (LCD) or a cathode ray tube (CRT)), an alphanumeric input device (e.g., a keyboard), a cursor control device (e.g., a mouse) and an acoustic signal generation device (e.g., a speaker). In one embodiment, a video display unit, alphanumeric input device, and cursor control device may be combined into a single component or device (e.g., an LCD touch screen).

Data storage device 1018 may include a computer-readable storage medium 1028 on which may be stored one or more sets of instructions 1025 that may include instructions for one or more components (e.g., messenger platform 110, the customer data platform 112, and the management tools 114) for carrying out the operations described herein, in accordance with one or more aspects of the present disclosure. Instructions 1025 may reside, completely or at least partially, within main memory 1004 and/or within processing device 1002 during execution thereof by computing device 1000, main memory 1004 and processing device 1002 constituting computer-readable media. The instructions 1025 may be transmitted or received over a communication network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" may be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Examples described herein may relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. The terms "comprises", "comprising", "includes", and/or "including", when used herein, may specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

In some embodiments, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in a manner that is capable of performing the task(s) at issue. "Configured to" may include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or an unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed:

1. A method comprising:
identifying a first group of user objects that are absent from a first user path, the first group of user objects having a first attribute, each user object being associated with a user device of a user, the first user path comprising a first edge, a second edge, an entry node, a first subsequent node, and a second subsequent node, each node comprising a condition block, a content block, and an action block, the condition block of the first subsequent node indicating whether respective user object advances within the first user path from the first subsequent node along the first edge or the second edge;
locating active checkpoints within other user paths with each active checkpoint having a user object associated therewith;
forming a second group of the user objects associated with the active checkpoints from the other user paths;
performing, with a processing device, a negative match with a second attribute to:
remove a first user object from the first group that matches the second attribute to keep a first set of remaining user objects in the first group;
prevent the first user object from entering the first user path;
remove a second user object from the second group that matches the second attribute to keep a second set of remaining user objects in the second group; and
prevent the second user object from entering the first user path;
generating a third group comprising the first set of remaining user objects and the second set of remaining user objects;
processing, in response to forming the third group, each user object of the third group to:
place each user object at the entry node of the first user path;
create a first active checkpoint for each user object at the entry node;
advance each user object from the entry node to the first subsequent node of the first user path; and
create a subsequent checkpoint for each user object at the first subsequent node; and
completing a task associated with the first subsequent checkpoint.

2. The method of claim 1, further comprising:
locating expired checkpoints within the other user paths with each expired checkpoint having a user object associated therewith to form a fourth group of user objects associated with the expired checkpoints; and
processing each user object associated with the expired checkpoints by advancing the user object along false edges or removing the user object from the respective user path in response to locating expired checkpoints.

3. The method of claim 1, further comprising:
locating user objects that match exit rules for a respective user path; and
removing user objects that match exit rules for the respective user path in response to locating the user objects matching exit rules.

4. The method of claim 1, wherein completing the task associated with the first subsequent checkpoint comprises:
attempting to match each user object with a respective ruleset of the first subsequent node; and
advancing each user object along at least one true edge to the second subsequent node in response to matching the user object with the respective ruleset.

5. The method of claim 4, wherein completing the task associated with the first subsequent checkpoint comprises advancing each user object along at least one false edge to a third subsequent node in response to not matching the user object with the respective ruleset.

6. The method of claim 4, wherein completing the task associated with the first subsequent checkpoint comprises completing an entry record for the first user path in response to not matching the user object with the respective ruleset.

7. The method of claim 6, wherein completing the entry record for the first user path is in response to no false edges extending from the first subsequent node.

8. The method of claim 4, wherein completing the task associated with the first subsequent checkpoint comprises following a processing condition of the first subsequent checkpoint in response to not matching the user object with the respective ruleset.

9. The method of claim 8, wherein following the processing condition of the active checkpoint comprises snoozing the first subsequent checkpoint for a period of time defined by the processing condition.

10. A system comprising:
a memory; and
a processing device, operatively coupled to the memory, to:
identify a first group of user objects that are absent from a first user path, the first group of user objects having a first attribute, each user object being associated with a user device, the first user path comprising a first edge, a second edge, an entry node, a first subsequent node, and a second subsequent node, each node comprising a condition block, a content block, and an action block, the condition block of the first subsequent node indicating whether respective user object advances within the first user path from the first subsequent node along the first edge or the second edge;
locate active checkpoints within other user paths with each active checkpoint having a user object associated therewith;

form a second group of the user objects associated with the active checkpoints from the other user paths;
perform a negative match with a second attribute to:
remove a first user object from the first group that match the second attribute to keep a first set of remaining user objects in the first group;
prevent the first user object from entering the first user path;
remove a second user object from the second group that match the second attribute to keep a second set of remaining user objects in the second group; and
prevent the second user object from entering the first user path;
generate a third group comprising the first set of remaining user objects and the second set of remaining user objects;
process, in response to forming the third group, each user object of the third group to:
place each user object at the entry node of the first user path;
create a first active checkpoint for each user object at the entry node;
advance each user object from the entry node to the first subsequent node of the first user path; and
create a subsequent checkpoint for each user object at the first subsequent node; and
complete a task associated with the first subsequent checkpoint.

11. The system of claim 10, wherein the processing device is further to:
locate expired checkpoints within the other user paths with each expired checkpoint having a user object associated therewith to form a fourth group of user objects associated with the expired checkpoint; and
process each user object associated with an expired checkpoint by advancing the user object along false edges or removing the user object from the respective user path in response to locating expired checkpoints.

12. The system of claim 10, wherein the processing device is further to:
locate user objects that match exit rules for a respective user path; and
remove user objects that match exit rules for the respective user path in response to locating the user objects matching exit rules.

13. The system of claim 10, wherein completing the task associated with the first subsequent checkpoint causes the processing device to:
attempt to match each user object with a respective ruleset of the first subsequent node; and
advance each user object along at least one true edge to the second subsequent node in response to matching the user object with the respective ruleset.

14. The system of claim 13, wherein completing the task associated with the first subsequent checkpoint causes the processing device to:
advance each user object along at least one false edge to a third subsequent node in response to not matching the user object with the respective ruleset; or
complete an entry record for the first user path in response to not matching the user object with the respective ruleset.

15. The system of claim 13, wherein completing the task associated with the first subsequent checkpoint causes the processing device to follow a processing condition of the first subsequent checkpoint in response to not matching the user object with the respective ruleset.

16. The system of claim 15, wherein following the processing condition of the active checkpoint causes the processing device to snooze the first subsequent checkpoint for a period of time defined by the processing condition.

17. A non-transitory computer-readable medium storing instructions that, when executed by a processing device, cause the processing device to:
identify a first group of user objects that are absent from a first user path, the first group of user objects having a first attribute, each user object being associated with a user device, the first user path comprising a first edge, a second edge, an entry node, a first subsequent node, and a second subsequent node, each node comprising a condition block, a content block, and an action block, the condition block of the first subsequent node indicating whether respective user object advances within the first user path from the first subsequent node along the first edge or the second edge;
locate active checkpoints within other user paths with each active checkpoint having a user object associated therewith;
form a second group of the user objects associated with the active checkpoints from the other user paths;
perform a negative match with a second attribute to:
remove a first user object from the first group that match the second attribute to keep a first set of remaining user objects in the first group;
prevent the first user object from entering the first user path;
remove a second user object from the second group that match the second attribute to keep a second set of remaining user objects in the second group; and
prevent the second user object from entering the first user path;
generate a third group comprising the first set of remaining user objects and the second set of remaining user objects;
process, in response to forming the third group, each user object of the third group to:
place each user object at the entry node of the first user path;
create a first active checkpoint for each user object at the entry node;
advance each user object from the entry node to the first subsequent node of the first user path; and
create a subsequent checkpoint for each user object at the first subsequent node; and
complete a task associated with the first subsequent checkpoint.

18. The non-transitory computer-readable medium of claim 17, wherein when executed further cause the processing device to:
locate expired checkpoints within the other user paths with each expired checkpoint having a user object associated therewith to form a fourth group of user objects associated with the expired checkpoints; and
process each user object associated with an expired checkpoint by advancing the user object along false edges or removing the user object from the respective user path in response to locating expired checkpoints.

19. The non-transitory computer-readable medium of claim 17, wherein when executed further cause the processing device to:
locate user objects that match exit rules for a respective user path; and remove user objects that match exit rules for the respective user path in response to locating the user objects matching exit rules.

* * * * *